United States Patent Office 3,452,856
Patented July 1, 1969

3,452,856
CONVEYOR SYSTEMS
Anthony S. Brittain, Burbage, England, assignor, by mesne assignments, to National Biscuit Company, New York, N.Y., a corporation of New Jersey
Filed June 20, 1967, Ser. No. 647,556
Claims priority, application Great Britain, Jan. 30, 1967, 4,531/67
Int. Cl. B65g 37/00, 43/10
U.S. Cl. 198—76                            12 Claims

ABSTRACT OF THE DISCLOSURE

A conveyor system for conveying articles to a delivery point includes a first conveyor for delivering articles at regular or irregular intervals to a second conveyor which has a locating device for each article. A motor driving the second conveyor is connected also to drive the first conveyor at a slightly faster speed than the second conveyor through a differential mechanism, and a photocell system detects when an article will be delivered too early by the first conveyor and actuates the differential mechanism to slow the first conveyor for a predetermined time interval.

---

Figure 1:
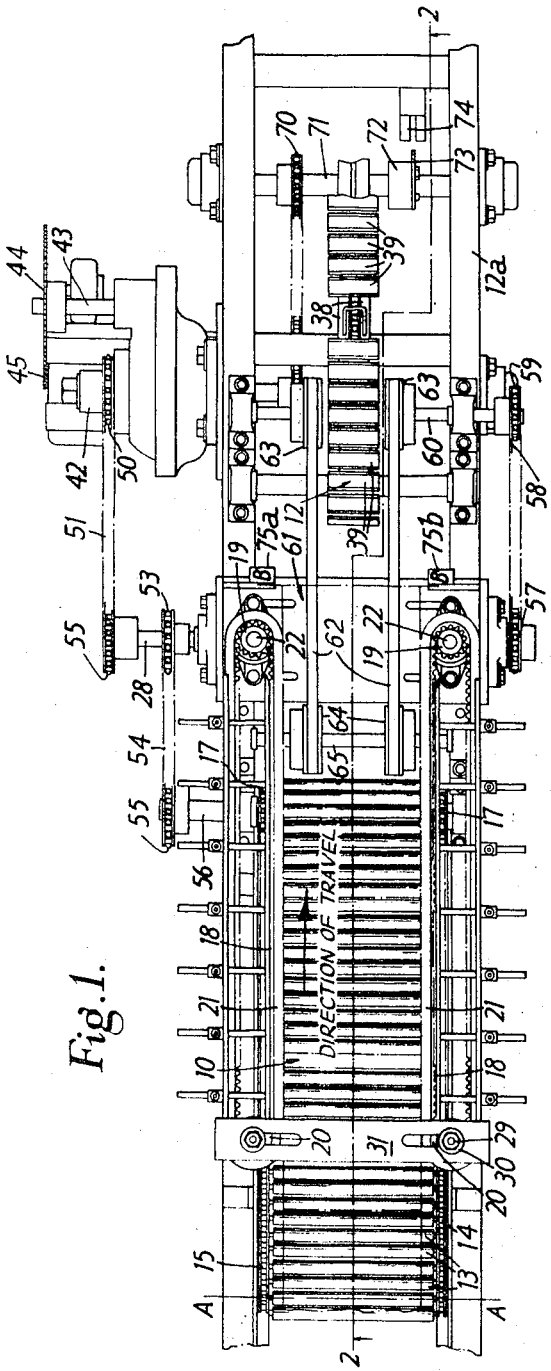

This invention relates to conveyor systems and has a particularly useful but not exclusive application where articles arriving at a station at uneven intervals are required to be collected from this station and to be presented to a processing machine at time intervals determined by the processing machine.

According to the present invention there is provided a conveyor system for feeding articles, which system comprises a first conveyor, a second conveyor which receives articles in succession from the first conveyor and carries the articles to a delivery point, said first and second conveyors normally operating respectively to deliver and receive articles at a first rate and at a second rate, one of which rates is consistently greater than the other, a locating device on the first conveyor for each such article, means for varying the speed of one of the conveyors relative to that of the other such that said other speed is greater than said one speed, means for comparing the actual position of an article approaching the second conveyor along the conveyor system relative to the position of the locating device which is to locate this article on the second conveyor with a predetermined position of the article relative to said locating device, the comparing means being adapted to initiate operation of the relative speed varying means to alter the speed of said one of the conveyors, when the comparing means detects that the error between the actual relative positions and the predetermined relative positions of the article and said locating device has grown to a predetermined size, to correct the error, and means for arresting operation of the speed varying means when the error has been substantially corrected. In preferred constructions according to the invention the first conveyor is driven at speeds greater than the second conveyor and the speed varying means operates to reduce the speed of the first conveyor to a speed below that of the second conveyor.

The comparing means may conveniently be responsive to an error in the position of an article on the first conveyor when the locating device which is to receive the article is in a predetermined position along the path of movement of the device. In one construction the comparing means comprises a first photoelectric cell for giving a signal as and when each locating device reaches a predetermined position and a second photoelectric cell for giving a signal when said article on the first conveyor reaches a predetermined article position. Preferably in operation of the system, the comparing means emits a signal indicating the existence of an error if when the first cell signals that the locating device is in its predetermined position, the second cell is signalling the presence of the article on the first conveyor at said predetermined article position.

According to still another preferred feature of the invention an intermediate conveyor is provided for transferring the articles from the first conveyor to the second conveyor and, in operation of the system, moves faster han the first and second conveyors.

Figure 2:
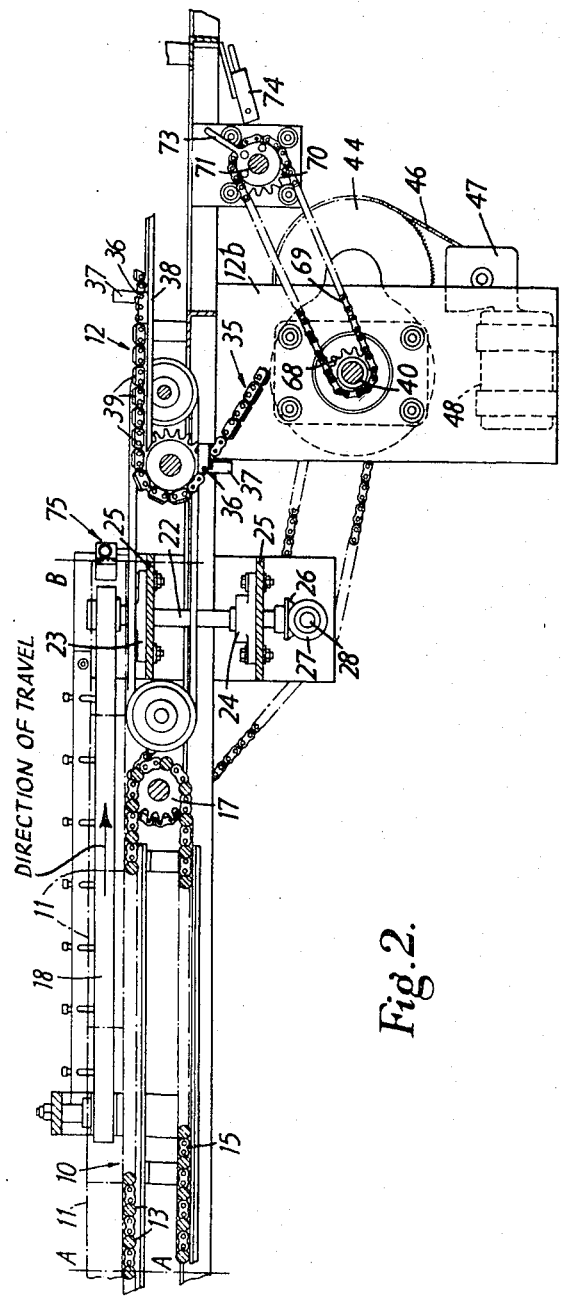

One embodiment of the invention will now be described, by way of example, with reference to the accompanying drawings, in which:

FIGURE 1 is a fragmentary plan of a conveyor system for conveying trays to a wrapping machine, and FIGURE 2 is a sectional elevation on the plane 2—2 of FIGURE 1.

Referring to the drawings, there is shown a conveyor system comprising a first conveyor 10 along which a succession of trays 11, indicated in broken lines in FIGURE 2, are conveyed and a second conveyor 12 to which the trays 11 are transferred from conveyor 10 to be carried to a wrapping machine (not shown). Conveyor 10 comprises a series of parallel low-friction rollers 13, the ends of which are mounted on parallel endless chains 14, 15 extending along the length of the conveyor. The chains extend at their forward ends round sprockets 17 which are driven in a manner to be described presently.

At opposite sides of its end portion nearer the conveyor 12, conveyor 10 has a pair of toothed endless side belts 18 which grip articles moving along the conveyor between them. Each of the side belts extends round two toothed pulleys 19, 20 and is covered on its article-engaging face with a layer of foam rubber 21. Pulleys 19 are secured on respective upright shafts 22 each of which is carried at its upper and lower ends in bearing blocks 23, 24 secured to the frame 25 of the machine. Bevel gears 26 are secured to the lower ends of these shafts 22 and engage complementary bevel gears 27 on a driving shaft 28. To permit adjustment of the positions of the side belts the fixed parts of the frame 25 to which the bearing blocks 23, 24 are secured are slotted to enable the bearing blocks and pulley shafts to be adjusted towards and away from the lengthwise centre line of the conveyor 10. Short vertical shafts 29 carrying pulleys 20 are secured by nuts 30 to a stationary bridge piece 31 fixed to the conveyor frame, and the position of shafts 29 can be adjusted along slots in the bridge piece towards and away from the centre line of conveyor 10.

The second conveyor 12 comprises an endless chain 35, the upper run of which is horizontal and is aligned with the centre line of the first conveyor 10. At equally spaced intervals along its length the chain has elongated rivets 36 by which lugs 37 which are generally L-shaped viewed from the side are pivotally attached to the chain. A fixed horizontal guide bar 38 is secured to the frame 12a of the conveyor just below the upper run of the chain, and the lugs straddle the chain and engage the guide members so that one limb of each lug projects vertically upwards. The lugs constitute locating devices for locating the articles on the second conveyor. Horizontal plate elements 39 are secured to the respective chain links between the lugs and have their leading and trailing edges chamfered as shown.

Conveyor 12 conveys the trays 11 to the wrapping machine (not shown) which wraps each tray individually. At its end nearer the wrapping machine, the endless chain 35 of conveyor 12 extends round a sprocket (not shown) which is driven from a main drive shaft on the wrapping machine such that the upper run of conveyor 12 advances a distance equal to the distance between two successive lugs 37 during the time taken for the wrapping machine to perform a wrapping cycle.

A drive shaft 40 is mounted in fixed frame plates 12b below the receiving end of conveyor 12 and is driven from the previously mentioned main drive shaft of the wrapping machine by a connection which is not shown. The drive shaft 40 forms the input shaft of a differential mechanism 41 of conventional form which incorporates an input gear member secured on the drive shaft 40, a coaxial output gear member secured on an output shaft 42 and an intermediate control member constituted by a rotary cage carrying planet gears meshing with the input and output gear members. The cage of the differential mechanism is driven by a pinion secured on a control shaft 43. Shaft 43 carries a sprocket wheel 44 driven through a chain 46 from a sprocket 45 secured on the output shaft of a gear box 47, the input shaft of which is driven by a servo-motor 48 secured to one of the frame plates 12b.

A sprocket 50 is secured on the output shaft 42 of the differential mechanism and drives through a chain 51 a sprocket 52 secured on the cross shaft 28 which drives the side belts 18. A second sprocket 53 is secured on the cross shaft 28 and drives through a chain 54 a sprocket 55 secured on a drive shaft 56 on which the drive sprockets 17 for conveyor 10 are secured. A further sprocket 57 is secured on the cross shaft 28 at its opposite end from sprocket 52 and drives through a chain 58 another sprocket 59 secured on a shaft 60 which extends beneath the upper run of the chain of conveyor 12 so as to drive an intermediate conveyor 61 between conveyors 10 and 12. This intermediate conveyor comprises parallel endless belts 62 extending round pulleys 63 on shaft 60 and round pulleys 64 on a shaft 65. Shaft 65 is carried in the frame of conveyor 10 and is disposed so that articles released by the side belts 18 are carried on by belts 62. At the opposite end of their upper run, the belts 62 overlap the receiving end of conveyor 12. Belts 62 move at a slightly higher speed than conveyors 10 and 12.

The input shaft 40 of the differential mechanism carries a sprocket 68 which drives through a chain 69 a sprocket 70 mounted on a cross shaft 71. A boss 72 is secured on shaft 71 and carries a radially projecting finger 73 which is arranged to pass between the lamp and receiving elements of a first photoelectric cell 74. This finger is timed and phased relative to conveyor 12 so that the finger interrupts the light path of the photoelectric cell whenever a lug 37 on conveyor 12 is correctly positioned for engagement with an article from conveyor 10.

A second photoelectric cell 75 is disposed just beyond the delivery end of the side belts 18 and comprises a lamp 75a and a receiver 75b disposed at opposite sides of the centre line of the conveyor 10 so that the articles pass between the lamp and the receiver.

In operation of the system, trays arrive at random on the left hand (not shown) of the conveyor 10 and are carried along on conveyor 10. An automatic switch (not shown) controls the speed of the wrapping machine in such a manner as to ensure that the conveyor system from the section marked A—A in FIGURE 1 up to the wrapping machine is kept full. Trays carried along the conveyor 10 move between the side belts, and the speed of conveyor 10 and of the side belts is controlled so that the belts feed forward slightly more than one tray length in the time taken by the wrapping machine to perform a complete cycle of operations. In the present instance this small over-feed is about one-sixteenth to one-twentieth of an inch.

The finger 73 on the boss 72 actuates operation of the photoelectric cell 74 when the next lug 37 for receiving the leading tray 11 is in the correct position, assuming that the forward edge of this tray is not forward of the position marked B—B in FIGURE 2. If the tray is forward of B—B, the tray interrupts the light path to the second photoelectric cell 75. The two photoelectric cells 74, 75 are connected in parallel with each other and in circuit with an amplifier unit in such a way that if the light paths of both cells are simultaneously in a state of interruption, a signal is fed into the amplifier unit, and the amplifier unit initiates operation of the servo-motor 48. At the same time the amplifier unit initiates operation of a time switch (not shown) which cuts off the energisation of the servo-motor 48 after a predetermined short period. The servo-motor operates the intermediate member of the differential mechanism and causes output shaft 42 of the differential mechanism to be retarded which in turn causes the conveyor 10 including the side belts to be retarded relative to the conveyor 12. The retardation of the conveyor 10 is such as to reduce the speed of the conveyor 10 below that of conveyor 12 so as to correct the error detected by the photoelectric cells.

If the leading edge of the leading tray is short of the line B—B no signal will be given by the amplifier unit and the tray when released by the side belts 18 is accelerated by the intermediate belts 62 onto the leading end of conveyor 12 just in front of the appropriate lug 37 on the conveyor 12.

Since the speed of conveyor 10 causes a slight over-feed of articles for conveyor 12, the error detected by photoelectric cells 74, 75 is always in the same sense, and the correction applied by the servomotor through the differential mechanism is also always in the same sense, i.e. to cause a reduction in the speed of conveyor 10 relative to conveyor 12. Thus successive trays tend to move forward relative to their respective lugs 37 until a point is reached where the front edge of a tray interrupts the light path of photoelectric cell 74 when the finger 73 indicates that a lug 37 is in the preselected position for receiving the tray. The amplifier unit then initiates operation of the servo-motor and conveyor 10 is retarded. The sequence is then repeated, the trays gradually moving forward again relative to their respective lugs.

Since the intermediate conveyor 61 moves faster than conveyor 10, a gap is formed between a tray just released from the side belts and the leading tray between the side belts, so that the trailing edge of the tray just released does not cause operation of the amplifier unit.

The rate of correction can readily be adjusted by employing different sized sprockets and gears to match the running speed of the wrapping machine or other machine to the length of the trays or other articles and tolerances on the positioning of the articles relative to the lugs or other locating devices on the conveyor 12.

The above described conveyor system has been found to permit high speeds of correct feeding by virtue of its very smooth correcting action.

I claim:
1. A conveyor system for feeding articles, which system comprises a first conveyor, a second conveyor which receives articles in succession from the first conveyor and carries the articles to a delivery point, said first and second conveyors normally operating respectively to deliver and receive articles at a first rate and a second rate, one of which rates is consistently greater than the other, a locating device on the first conveyor for each such article, means for varying the speed of one of the conveyors relative to that of the other such that said other rate is greater than said one rate, and means for comparing the actual position of an article approaching the second conveyor along the conveyor system relative to the position of the locating device which is to locate this article on the second conveyor with a predetermined position of the article relative to said locating device, the comparing means being adapted to initiate operation of the relative speed varying means to alter the speed of said one of the conveyors, when the comparing means detects that the error between the actual relative positions and the predetermined relative positions of the article and said locating device has grown to a predetermined size, to correct the error, and means for arresting operation of the speed varying means when the error has been substantially corrected.

2. A conveyor system as claimed in claim 1 wherein the arresting means arrests operation of the speed varying means a predetermined time interval after initiation of the speed varying means.

3. A conveyor system as claimed in claim 2, characterised in that the comparing means is responsive to an error in the position of an article on the first conveyor when the locating device which is to receive the article is in a predetermined position along the path of movement of the device.

4. A conveyor system as claimed in claim 3, characterised in that the comparing means comprises a first photoelectric cell for giving a signal as and when each locating device reaches a predetermined position and a second photoelectric cell for giving a signal when said article on the first conveyor reaches a predetermined article position.

5. A conveyor system as claimed in claim 4 characterised in that in operation of the system, the comparing means emits a signal indicating the existence of an error if when the first cell signals that the locating device is in its predetermined position, the second cell is signalling the presence of the article on the first conveyor at said predetermined article position.

6. A conveyor system as claimed in claim 2, further characterised by an intermediate conveyor for transferring the articles from the first conveyor to the second conveyor, and means for driving the intermediate conveyor faster than the first and second conveyors.

7. A conveyor system as claimed in claim 2, characterised in that means is provided for frictionally gripping the articles in engagement with the first conveyor at least over that portion of the length of the first conveyor nearest the second conveyor.

8. A conveyor system as claimed in claim 7, characterised in that the gripping means comprises a pair of side belts which are driven with the first conveyor and which face each other across the first conveyor for engaging opposite sides of an article on the first conveyor.

9. A conveyor system as claimed in claim 8, characterised in that the side belts are faced with a readily deformably foamed elastomeric material.

10. A conveyor system for feeding articles, which system comprises a first conveyor, a second conveyor which receives articles in succession from the first conveyor and carries the articles to a delivery point, said first conveyor being driven at a speed greater than second conveyor, means for reducing the speed of the first conveyor to a speed below that of the second conveyor, a locating device on the second conveyor for locating each such article, means for comparing the actual position of an article approaching the second conveyor along the conveyor system relative to the position of the locating device which is to locate this article on the second conveyor with a predetermined position of the article relative to said locating device, the comparing means being adapted to initiate operation of said speed reducing means, when the comparing means detects that the error between the actual relative positions and the predetermined relative positions of the article and the locating device has grown to a predetermined size, to correct the error, and means for arresting operation of the speed reducing means a predetermined time interval after its initiation.

11. A conveyor as claimed in claim 10, characterised in that the first and second conveyors are driven from a common driving member.

12. A conveyor system as claimed in claim 10, characterised in that the speed reducing means comprises a differential mechanism having an input member drivingly connected to the second conveyor and an output member connected to drive the first conveyor having a motor-driven intermediate member which is rotatable for reducing the speed of the output member relative to that of the input member and operation of which is initiated by the comparing means.

References Cited
UNITED STATES PATENTS

| | | | |
|---|---|---|---|
| 3,155,221 | 11/1964 | Griner | 198—76 |
| 3,231,063 | 1/1966 | Talbot | 198—165 |
| 3,236,358 | 2/1966 | Gieskieng | 198—37 |

FOREIGN PATENTS

| | | |
|---|---|---|
| 571,385 | 2/1959 | Canada. |

RICHARD E. AEGERTER, *Primary Examiner.*

U.S. Cl. X.R.

198—40